US009544390B1

(12) United States Patent
Baird (10) Patent No.: US 9,544,390 B1
(45) Date of Patent: Jan. 10, 2017

(54) SYSTEMS AND METHODS FOR FILTERING SHORTCUTS FROM USER PROFILES

(75) Inventor: Bradley Baird, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 1335 days.

(21) Appl. No.: 13/048,336

(22) Filed: Mar. 15, 2011

(51) Int. Cl.
*G06F 3/00* (2006.01)
*H04L 29/08* (2006.01)

(52) U.S. Cl.
CPC .................................. *H04L 67/306* (2013.01)

(58) Field of Classification Search
CPC ...................................................... H04L 67/306
USPC ........................................ 715/745, 738, 847
See application file for complete search history.

(56) References Cited

U.S. PATENT DOCUMENTS

| | | | |
|---|---|---|---|
| RE39,090 E * | 5/2006 | Beauregard et al. | |
| 7,073,172 B2 * | 7/2006 | Chamberlain | 717/169 |
| 7,937,431 B2 * | 5/2011 | Reasor et al. | 709/200 |
| 7,987,202 B2 * | 7/2011 | Noll et al. | 707/792 |
| 8,117,193 B2 * | 2/2012 | Svendsen et al. | 707/722 |
| 8,117,554 B1 * | 2/2012 | Grechishkin et al. | 715/764 |
| 8,161,172 B2 * | 4/2012 | Reisman | 709/228 |
| 8,312,017 B2 * | 11/2012 | Martin et al. | 707/736 |
| 8,452,812 B2 * | 5/2013 | Pedersen | H04L 67/1095 707/784 |
| 2007/0073640 A1 * | 3/2007 | Crudele et al. | 707/1 |
| 2008/0133547 A1 * | 6/2008 | Reasor et al. | 707/10 |
| 2009/0164641 A1 * | 6/2009 | Rogers et al. | 709/227 |
| 2009/0198566 A1 * | 8/2009 | Greenberg | 705/10 |
| 2009/0265636 A1 * | 10/2009 | Ruiz-Velasco et al. | 715/738 |
| 2009/0305674 A1 * | 12/2009 | Teittinen et al. | 455/411 |
| 2009/0327221 A1 * | 12/2009 | Noll et al. | 707/3 |
| 2010/0030713 A1 * | 2/2010 | Simpson et al. | 706/11 |
| 2010/0131903 A1 * | 5/2010 | Thomson et al. | 715/847 |
| 2010/0175104 A1 * | 7/2010 | Khalid | 726/1 |
| 2011/0153781 A1 * | 6/2011 | Srinivas, et al. | 709/219 |
| 2011/0225500 A1 * | 9/2011 | Casalaina et al. | 715/738 |

\* cited by examiner

*Primary Examiner* — William Titcomb
(74) *Attorney, Agent, or Firm* — Fisherbroyles, LLC (57) ABSTRACT

A method for filtering shortcuts may include: 1) identifying a user logged onto a computing system; 2) identifying a profile of the user that stores data associated with the user; 3) searching the user's profile for one or more shortcuts that target one or more computing resources; 4) for each computing resource targeted by one or more shortcuts in the user's profile, searching the computing system for the computing resource; 5) determining, based on a result of the search, that at least one computing resource targeted by a shortcut in the user's profile is not available on the computing system; and 6) filtering the shortcut that targets the unavailable computing resource by preventing the shortcut from being displayed to the user in a user interface when other items associated with the user's profile are displayed in the user interface. Various other methods, systems, and computer-readable media are also disclosed.

20 Claims, 7 Drawing Sheets

SYSTEMS AND METHODS FOR FILTERING SHORTCUTS FROM USER PROFILES

BACKGROUND

A user profile may enable a user to have a consistent desktop experience each time the user logs onto a computer. For example, a user profile may enable the desktop appearance to stay the same between sessions and may record user preferences for applications and operating system services. A user profile may be a profile specific to a particular computer or may be a roaming profile accessible by a user on multiple computers. In both situations, users typically expect to have a consistent desktop experience each time they log onto a computer using their profile.

Unfortunately, when a user configures a roaming profile on one computer, the profile may include shortcuts to resources that are not available on a different computer that the user may access using the same roaming profile. In traditional systems, when a user logs onto a machine that is missing a resource (e.g., an application) referenced by a shortcut in the user's profile, the user will still see the shortcut. The user may not realize that the application (or other resource) is not installed on the computer and may click on the shortcut to access the application, but the shortcut will not work. Such situations may leave the user confused and frustrated.

The recent trend toward virtualization has further complicated the issue of providing a user with a consistent, reliable experience when using roaming and local profiles. For example, virtualized applications may be easily enabled and disabled on a computing system. If a user's profile includes a shortcut to a virtualized application that is disabled, the shortcut will not work. The user may not realize that the application is not enabled, and as with the example above, may be frustrated. In such situations, users may waste valuable work time and may also tie-up help desk and service technician resources trying to resolve the perceived problem without realizing that the computer they are trying to fix simply is not configured to provide the resource they are attempting to use. What is needed, therefore, is a more efficient and effective mechanism for providing consistent user experiences with roaming and local profiles.

SUMMARY

As will be described in greater detail below, the instant disclosure generally relates to systems and methods for filtering shortcuts from user profiles. For example, a method for filtering shortcuts from user profiles may include 1) identifying a first user logged onto a first computing system; 2) identifying a profile of the first user that stores data associated with the first user; 3) searching the first user's profile for one or more shortcuts that target one or more computing resources; 4) for each computing resource targeted by one or more shortcuts in the first user's profile, searching the first computing system for the computing resource; 5) determining, based on a result of the search, that at least one computing resource targeted by a shortcut in the first user's profile is not available on the computing system; 6) filtering the shortcut that targets the unavailable computing resource by preventing the shortcut from being displayed to the first user in a graphical user interface when other items associated with the first user's profile are displayed in the graphical user interface.

The shortcut that targets the unavailable computing resource may be programmed such that, if the shortcut were to be displayed at the first computing system and selected by the first user, the first computing system would return an error to the user instead of accessing the unavailable computing resource.

The unavailable resource may be any type of software or hardware computing resource. For example, the unavailable computing resource may be a software application and the shortcut to the unavailable computing resource may target the software application. In such situations, determining that at least one computing resource is not available on the computing system may include determining that the software application is not accessible to the first user of the first computing system. The software application may be installed to a virtualization layer on the first computing system, and determining that the software application is not accessible to the first user of the first computing system may include determining that the virtualization layer is not enabled. Additionally or alternatively, determining that the software application is not accessible to the first user of the first computing system may include determining that the software application is not installed on the first computing system As another example, the unavailable computing resource may be associated with a hardware device, and determining that the computing resource is not available on the first computing system may include determining that the hardware device is not available to the first computing system. The hardware device may be a remote computing system, a printer, and/or any other type of local or remote hardware device.

Embodiments presented herein may filter a shortcut to a computing resource that is not available on one computing system but is available on another computing system. For example, the method discussed above may further include 1) identifying the first user logged onto a second computing system; 2) identifying the first user's profile, where the first user's profile comprises a roaming profile stored remotely on a server and transferred to the second computing system when the first user logs onto the second computing system; 3) performing a second search of the first user's profile for one or more shortcuts that target one or more computing resources; 4) determining that the computing resource that is not available on the first computing system is available on the second computing system; and 5) allowing the shortcut that targets the computing resource to be displayed to the first user.

Embodiments presented herein may filter a shortcut to a computing resource that is not available to one user of a computing system but is available to another user of the computing system. For example, the method for filtering shortcuts may further include: 1) identifying a second user logged onto the first computing system; 2) identifying a profile of the second user that stores data associated with the second user; 3) searching the second user's profile for one or more shortcuts that target one or more computing resources; 4) during the search of the second user's profile, identifying a shortcut to the computing resource that is not available to the first user on the first computing system; 5) determining that the computing resource that is not available to the first user on the first computing system is available to the second user on the first computing system; and 6) allowing the shortcut to the computing resource that is available to the second user to be displayed to the second user.

The shortcut may be prevented from being displaying in a variety of ways. For example, preventing the shortcut from being displayed may include temporarily removing the shortcut from the user's profile while the user is logged onto the first computing system. Alternatively, preventing the shortcut from being displayed may include hiding the shortcut by intercepting a request to provide shortcuts from the first user's profile and excluding the shortcut from a response to the request.

In certain embodiments, a system for filtering shortcuts from user profiles may include an identification module programmed to identify a first user logged onto a first computing system and to identify a profile of the first user that stores data associated with the first user. The system may also include a search module programmed to search the first user's profile for one or more shortcuts that target one or more computing resources. The search module may also be programmed to, for each computing resource targeted by one or more shortcuts in the first user's profile, search the first computing system for the computing resource.

The system may include a determination module programmed to determine, based on a result of the search, that at least one computing resource targeted by a shortcut in the first user's profile is not available on the first computing system. The system may further include a filter module programmed to filter the shortcut that targets the unavailable computing resource by preventing the shortcut from being displayed to the first user in a graphical user interface when other items associated with the first user's profile are displayed in the graphical user interface.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for filtering shortcuts from user profiles. For example, if a resource (e.g., a software application, a hardware device, a network resource, etc.) targeted by a shortcut in a user's profile is not available on a particular computer, the shortcut may be filtered (e.g., hidden) when the user logs onto the computer. Embodiments of the instant disclosure may apply to roaming user profiles and local profiles, and may help inform a user about which resources are available and which resources are not available on a particular computer. Thus, the systems and methods disclosed herein may result in less user confusion and frustration and a more consistent desktop experience for the user, among various other advantages.

Figure 1:
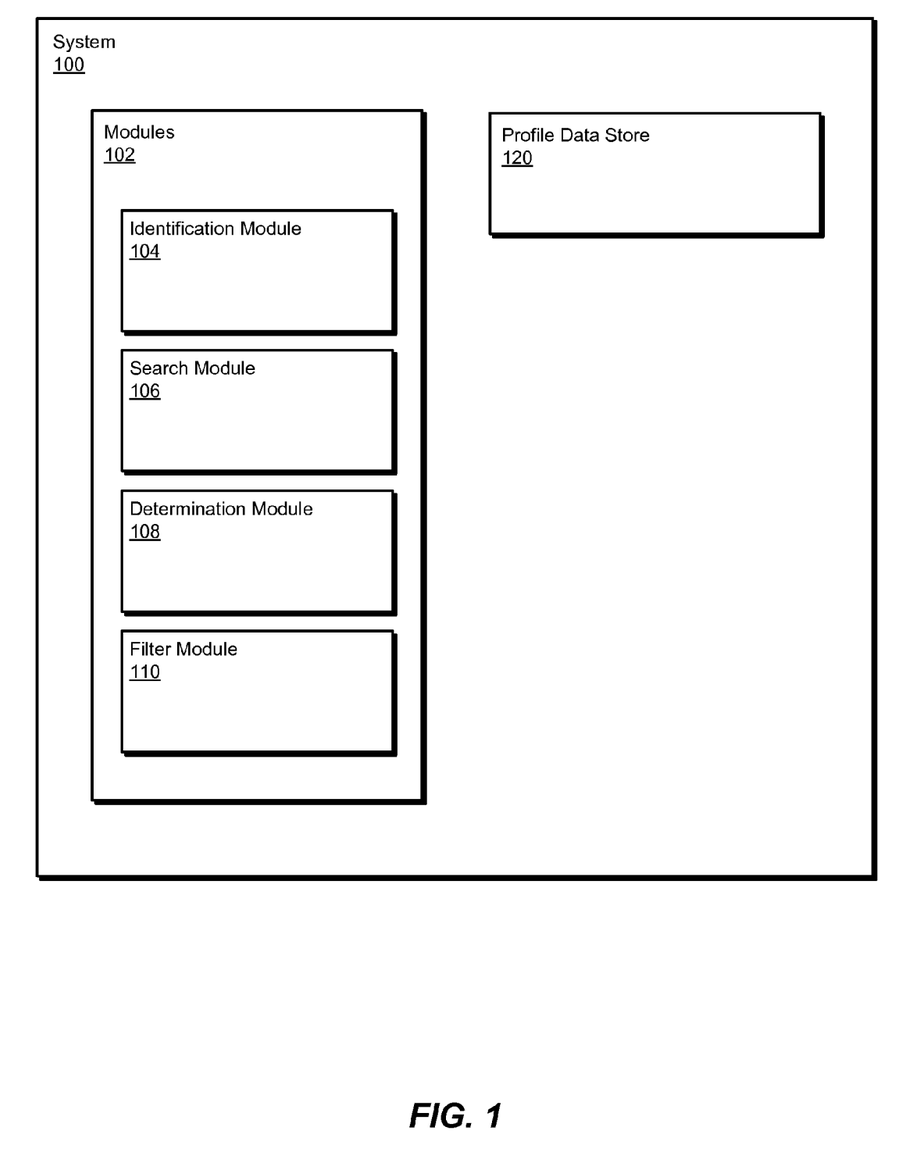
FIG. 1 is a block diagram of an exemplary system for filtering shortcuts from user profiles.
Figure 2:
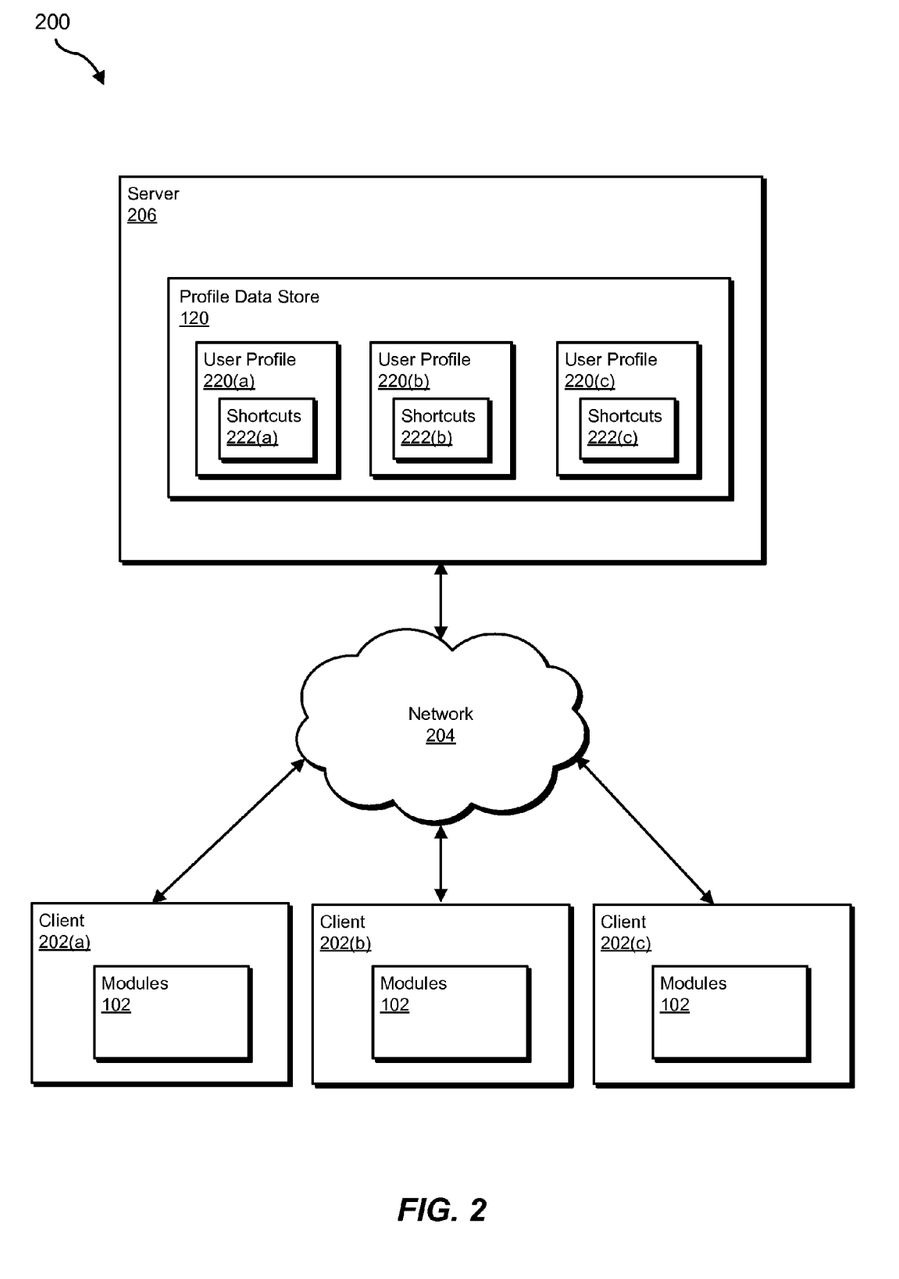
FIG. 2 is a block diagram of another exemplary system for filtering shortcuts from user profiles.

The following will provide, with reference to FIGS. 1-2, detailed descriptions of exemplary systems for filtering shortcuts from user profiles. Detailed descriptions of corresponding computer-implemented methods will also be provided in connection with FIG. 3. Detailed descriptions of exemplary graphical user interfaces are provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for filtering shortcuts from user profiles. As illustrated in this figure, exemplary system 100 may include one or more modules 102 for performing one or more tasks. For example, and as will be explained in greater detail below, exemplary system 100 may include an identification module 104 programmed to identify a user logged onto a computing system and identify a profile of the user that stores data associated with the user. Exemplary system 100 may also include a search module 106 programmed to search the user's profile for one or more shortcuts that target one or more computing resources. Search module 106 may also be programmed to, for each computing resource targeted by one or more shortcuts in the user's profile, search the computing system for the computing resource.

In addition, and as will be described in greater detail below, exemplary system 100 may include a determination module 108 programmed to determine, based on a result of the search, that at least one computing resource targeted by a shortcut in the user's profile is not available on the computing system. System 100 may also include a filter module 110 programmed to filter the shortcut that targets the unavailable computing resource by preventing the shortcut from being displayed to the user in a graphical user interface when other items associated with the user's profile are displayed in the graphical user interface.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., clients 202(a-c) and server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include a profile data store 120. Data store 120 may represent portions of a single database or computing device or a plurality of databases or computing devices. Profile data store 120 may store user profiles for one or more users.

Profile data store 120 in FIG. 1 may represent a portion of one or more computing devices. For example, profile data store 120 may represent a portion of server 206 in FIG. 2, computing system 610 in FIG. 6, and/or portions of exemplary network architecture 700 in FIG. 7. Alternatively, profile data store 120 in FIG. 1 may represent one or more physically separate devices capable of being accessed by a computing device, such as server 206 in FIG. 2, computing system 610 in FIG. 6, and/or portions of exemplary network architecture 700 in FIG. 7. In some embodiments, profile data store 120 may additionally or alternatively be stored on one or more of clients 202(a-c).

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As an example, FIG. 2 shows a system 200 that may represent a server domain (e.g., a WINDOWS Server Domain) with a client system 202(a), a client system 202(b), a client system 202(c), and a server 206. In one embodiment, and as will be described in greater detail below, each of client systems 202(a-c) may be programmed with instances of modules 102 and may each access resources on server 206. In some embodiments, clients 202(a-c) may represent terminals of server 206, which may be a centralized data center or any other type of centralized network system.

Clients 202(a-c) generally represents any type or form of computing device capable of reading computer-executable instructions. Examples of computing devices 202(a-c) include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Server 206 generally represents any type or form of computing device that is capable of providing one or more computing resources to clients 202(a-c) Examples of server 206 include, without limitation, application servers and database servers configured to provide various database services and/or run certain software applications. As shown, server 206 may include profile data store 120, which may include a user profile 220(a), a user profile 220(b), and a user profile 220(c), which represent profiles of three different users. Any of the users may log onto any of clients 202(a-c) via their profile. User profiles 220(a), 220(b), and 220(c) may include shortcuts 222(a), 222(b), and 222(c), respectively. Shortcuts 222(a), 222(b), and 222(c) may represent shortcuts configured and customized by users of the respective user profiles. As described in greater detail below, user profiles 220(a), 220(b), and 220(c) may include a variety of other types of information in addition to shortcuts.

Clients 202(a-c) and server 206 may communicate over network 204. Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections.

Figure 3:
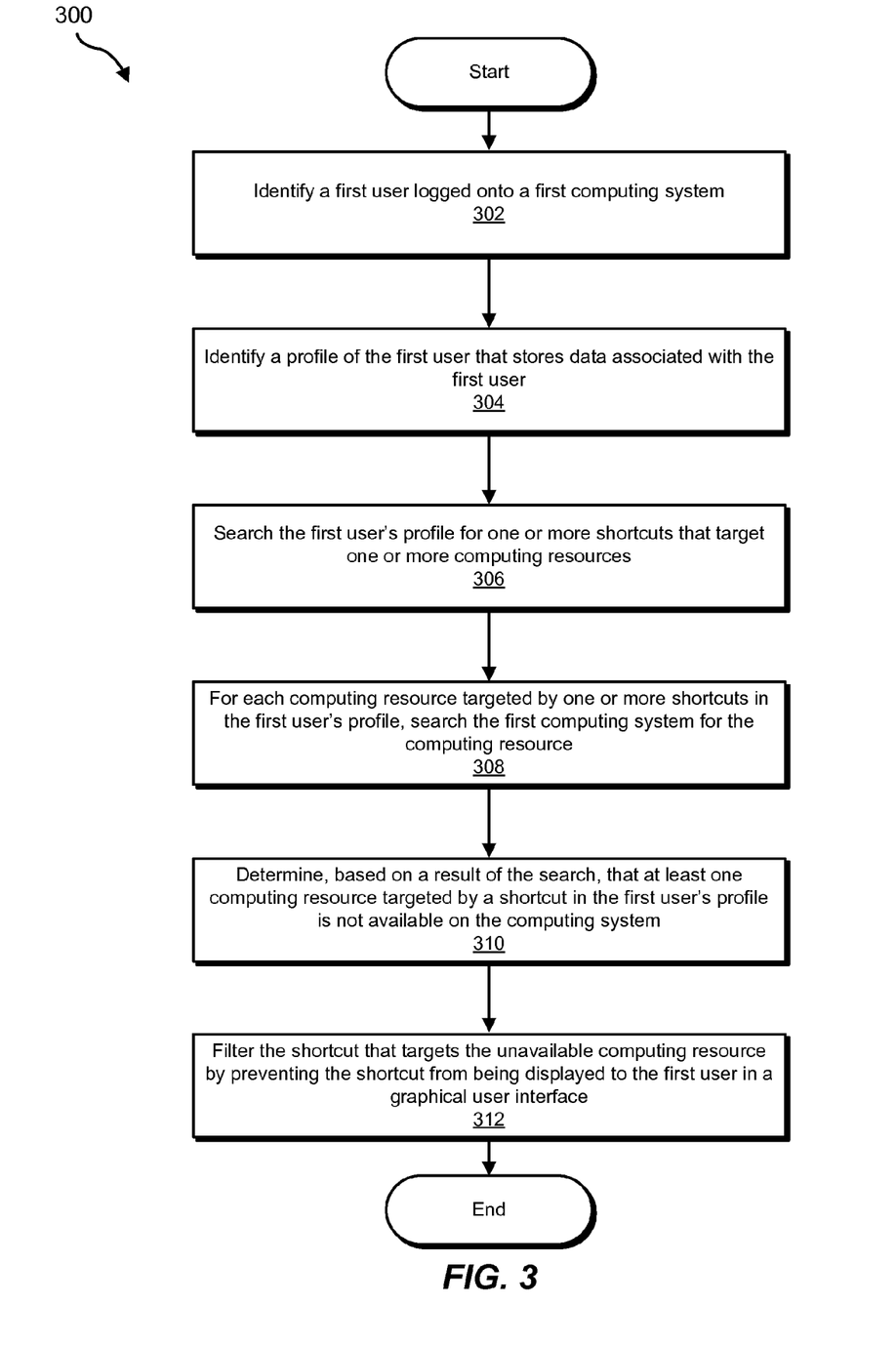
FIG. 3 is a flow diagram of an exemplary method for filtering shortcuts from user profiles.

FIG. 3 is a flow diagram of an exemplary computer-implemented method 300 for filtering shortcuts from user profiles. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may identify a first user logged onto a first computing system. For example, identification module 104 in FIG. 1 (which may, as detailed above, represent a portion of client 202(a)) may identify a user logged onto client 202(a).

Identification module 104 may identify a user logged onto a computing system in a variety of different contexts and in a variety of different ways. For example, identification module 104 may identify a first user logged onto a computing system by detecting a log-on event (e.g., a user entering credentials into a computing system, a user powering up a computing system, a user otherwise identifying herself to a computing system). Additionally or alternatively, identification module 104 may identify a user logged onto a computing system at a time other than login by locating credentials of a current user of the computing system, querying a current user of the computing system, and/or in any other suitable manner.

As noted, a user may be logged onto a computing system in a variety of different contexts. For example, a user may be logged on to a computing system in an enterprise environment, such as a WINDOWS server environment. In such embodiments, when a user logs onto a computing system (e.g., a terminal or client system), the user's profile may be sent to the computing system. In other embodiments, a user may be logged onto a workstation, such as a desktop computer or a laptop, that is shared by multiple users.

At step 304 in FIG. 3, one or more of the systems described herein may identify a profile of the first user that stores data associated with the first user. For example, identification module 104 in FIG. 1 (which may, as described above, be part of client 202(a) in FIG. 2) may identify a profile of the user of client 202(a).

As used herein, the term "profile" generally refers to any collection of data associated with a specific user. In other words, a profile may be a digital representation of a person's identity (e.g., including a name, a username, logon credentials, and/or other personal information), a person's preferences for configuration of a graphical user interface (e.g., placement of shortcuts on a desktop, in a task bar, in a notification area, in a start menu, within certain folders or interfaces, etc.), settings set by the user for one or more programs (e.g., functional settings that control the operation of a program, settings that control the look and feel of a program, bookmarks or other shortcuts accessed by the program, etc.), operating system settings, and/or any other settings or data that may be associated with a user.

As one example, a WINDOWS user profile may include any user's personalize settings for applications installed on a computer in an NTUSER.DAT file. When a user logs onto a computer, an NTUSER.DAT file associated with the user may be merged into a computer's registry such that it appears as the HKEY_current_user branch of the registry tree.

A WINDOWS profile may also indicate contents (e.g., files, shortcuts, etc.) of a user's "My Documents" directory. A WINDOWS profile may further include favorites, cookies, and/or history related to web browsing and other online activities of a user. In some situations, a WINDOWS profile may include nethood and printhood information (i.e., may indicate network shares and printers discovered by the user in the form of shortcuts).

In some embodiments, a profile may indicate items (e.g., shortcuts) to be displayed on a user's desktop, in a user's task bar, and/or in a start menu and may indicate locations of each of the items on the desktop, in the taskbar, and/or in the start menu.

As noted above, a user's profile may be a roaming profile. One example of a roaming profile is a roaming user profile used in a MICROSOFT WINDOWS NT environment that allows a user with a computer joined to a WINDOWS SERVER DOMAIN to log onto any computer in the same network. A roaming profile may enable a user to access their documents and have a relatively consistent desktop experience (e.g., such as applications remembering toolbar positions and preferences, or the desktop appearance saying the same) among various different computers.

A user's profile may be indentified in various different ways. For example, a user's profile may be identified by searching a local system and/or querying a remote server. Using FIG. 2 as an example, user profiles 220(a-c) may be roaming profiles of three separate users. As shown, user profiles 220(a-c) may be stored on a centralized file server (e.g., server 206) that may be accessible from any network-joined computer (e.g., clients 202(a-c)). Identification module 104 may identity user profile data as it resides on server 206.

In the example shown in FIG. 2, if a user successfully logs onto the domain of system 200 via client 202(a), user profile 220(a) may be copied from server 206(a) to client 202(a), and a local account may be created for the user on client 202(a), where it may be identified by identification module 104. When the user logs off client 202(a), user profile 220(a) may be copied from client 202(a) back to server 206, not including any temporary local file profile items. In some embodiments, the user's profile information may remain on the local computer in addition to being copied back to the network.

In other embodiments, identification module 104 may identify a user profile on a local client. For example, when a user's profile is not a roaming profile (i.e., is a profile stored only locally on a computing system), identification module 104 may identify the local user profile of the user by searching the computing system for profile data associated with the user.

At step 306 in FIG. 3, one or more of the systems described herein may search the first user's profile for one or more shortcuts that target one or more computing resources. For example, search module 106 in FIG. 1 (which may, as detailed above, be installed on client 202(a)) may search user profile 220(a) for one or more shortcuts that target one or more computing resources available to the user while the user is logged onto client 202(a).

Shortcuts in a user's profile may be shortcuts that are intended to be displayed in a taskbar, a start menu, a desktop, a notification region, and/or within any other folder or graphical user interface. Shortcuts may point to software applications, files associated with (e.g., opened by) software applications, network resources (e.g., remote data stores, servers, computers, websites, etc.), local hardware (network access cards, external hard drives, printers, scanners, etc.), and/or any other computing resource. A shortcut may target a resource by including a link to the resource (e.g., a target to a software application may include a link to an executable file that launches the application), an address of a network resource, a link to a file, and/or any other information that identifies, locates, and/or otherwise refers to a computing resource.

Search module 106 may search the first user's profile for shortcuts in a variety of manners. For example, search module 106 may search the user's profile for any files with file extensions indicative of the files being shortcuts (e.g., files with a .lnk extension). Search module 106 may additionally or alternatively search user profile directories associated with shortcuts (e.g., a start folder, a desktop folder, a taskbar folder, etc.), and/or may search the users profile for shortcuts in any other suitable manner.

At step 308 in FIG. 3, one or more of the systems described herein may, for each computing resource targeted by one or more of the shortcuts identified in the user's profile, search the first computing system for the computing resource. Continuing with the previous example, search module 106 may search client 202(a) for computing resources associated with shortcuts identified in user profile 220(a), which may include shortcuts 222(a).

Search module 106 may search a computing system for computing resources associated with shortcuts in any suitable manner. For example, search module 106 may determine whether an application pointed to by a shortcut is installed or otherwise included on the computing system. In other embodiments, a shortcut may point to a document or other file that requires a particular application to open the file. In such embodiments, search module 106 may search the computing system for the application to determine whether the file referred to by the shortcut can be opened.

If the computing system includes a virtualized application (i.e., an application installed to a virtualization layer), search module 106 may determine whether the virtualization layer is activated. As used herein the phrase "virtualized application" generally refers to any application that is stored virtually rather than at an operating system level.

In some embodiments, an application may be virtualized by installing it to a virtualization layer. When a virtualization layer storing an application is enabled, files and/or configuration data of the application may overlay any corresponding files of a base file system and/or base operating system. The base operating system may be presented with an expected view of data of the application by intercepting and manipulating file system calls to create the appearance that one or more files stored in the virtualization layer are from the base file system. File calls may be manipulated by redirecting the calls to the virtualization layer rather than the base file system. In other words, virtualization software may intercept file system and/or registry calls. If the virtualization layer containing the application is activated (e.g., enabled), the virtualization software may redirect such calls to the virtualization layer. If the virtualization layer is not activated, the virtualization software may allow such calls to pass through to the base operating system.

In some embodiments, search module 106 may search the computing system for a computing resource to determine whether the computing resource is available through the computing system. For example, search module 106 may determine whether a hard drive or a printer pointed to by a shortcut in user profile 220(a) is accessible via client 202(a) when the user associated with profile 220(a) is logged onto client 202(a). Similarly, search module 106 may search client 202(a) for computing resources pointed to by shortcuts by determining whether hardware components pointed to or needed for use by a shortcut are available on client system 202(a). For example, search module 106 may search client 202(a) for a network access card to determine whether a network resource pointed to by a shortcut would be available to the user. Search module 106 may also search for connections to local or remote printers, scanners, hard drives, web sites, and/or any other types of hardware or software resources. In some embodiments, search module 106 may search for a resource identified by a shortcut by executing the shortcut (e.g., following the link provided in the shortcut).

At step 310 in FIG. 3, one or more of the systems described herein may determine, based on a result of the search in step 308, that at least one computing resource targeted by a shortcut in the first user's profile is not available on the computing system. For example, determination module 108 in FIG. 1 (which may, as detailed above, represent a portion of one or more of clients 202(a-c)) may determine that at least one computing resource targeted by a shortcut in user profile 220(a) is not available on client 202(a).

Determination module 108 may determine that a computing resource targeted by a user's profile is not available in a variety of different ways. For example, determination module 108 may determine that a computing resource is not available on client 202(a) by determining that a software application is not accessible to the user logged onto client 202(a). For example, determination module 108 may determine that the computing resource is not available if the search module was unable to find the software application on client 202(a) or if the software application is installed in an inactive virtualization layer on client 202(a).

As another example, determination module 108 may determine that a file targeted by a shortcut can only be opened by an application that is not available on client 202(a). As a result, determination module 108 may determine that the computing resource (e.g., the file) cannot be opened because the application associated with the file is not available on client 202(a).

As another example, determination module 108 may determine that a hardware device is not available on client 202(a) if search module 106 is unable to identify a driver for the hardware device, is unable to connect to the hardware device, and/or is unable to detect the hardware device in any other way. Similarly, determination module 108 may determine that a network resource is not available on client 202(a) if search module 106 was unable to contact the network resource, was unable to access a network connection needed to access the network resource, and/or was unable to identify the network resource in any other way.

Determination module 108 may determine that a resource is unavailable if search module 106 was unable to access the resource because a client device does not have adequate security credentials to access the resource. For example, search module 106 may be unable to access a network resource identified by a shortcut in user profile 220(a) if client 202(a) does not have access privileges to the network resource.

In some embodiments, determination module 108 may determine that a computing resource is unavailable when, if the shortcut to the resource were to be displayed on a computing system and selected by the first user, the computing system would return an error to the user instead of accessing the resource. In other words, determination module 108 may determine that a computing resource is unavailable if, when search module 106 attempts to execute a shortcut associated with the resource, the shortcut fails to properly execute.

At step 312 in FIG. 3, one or more of the systems described herein may filter the shortcut that targets the unavailable computing resource by preventing the shortcut from being displayed to the first user in a graphical user interface when other items associated with the first user profile are displayed in the graphical user interface (e.g., when a desktop of an operating system is displayed to the user). For example, filter module 110 in FIG. 1 may, as part of client 202(a), filter a shortcut from user profile 220(a) from being displayed to a user.

Filter module 110 may filter a shortcut and prevent it from being displayed in a variety of different ways. For example, filter module 110 may prevent the shortcut from being displayed by temporarily removing the shortcut from a user's profile (e.g., removing the shortcut from the user's profile while the user is logged onto a computer and replacing the shortcut to the user's profile when the user logs out of the computer). In other embodiments, filter module 110 may filter a shortcut by hiding it from a user or otherwise obscuring it from a user's view.

Additionally or alternatively, filter module 110 may filter a shortcut by intercepting a request to provide shortcuts for the user's profile and excluding the shortcut in a response to the request. For example, a service control manager may attempt to load a user's profile. Filter module 110 may intercept a call from the service control manager (e.g., by hooking a service control manager process) that attempts to access shortcuts in the user's profile during the load process. Filter module 110 may manipulate a response to the service control manager call by filtering any shortcuts to unavailable computing resources from being provided in a response to the service control manager call. Various other methods and/or technologies may also be implemented to filter shortcuts that point to unavailable computing resources.

Figure 4:
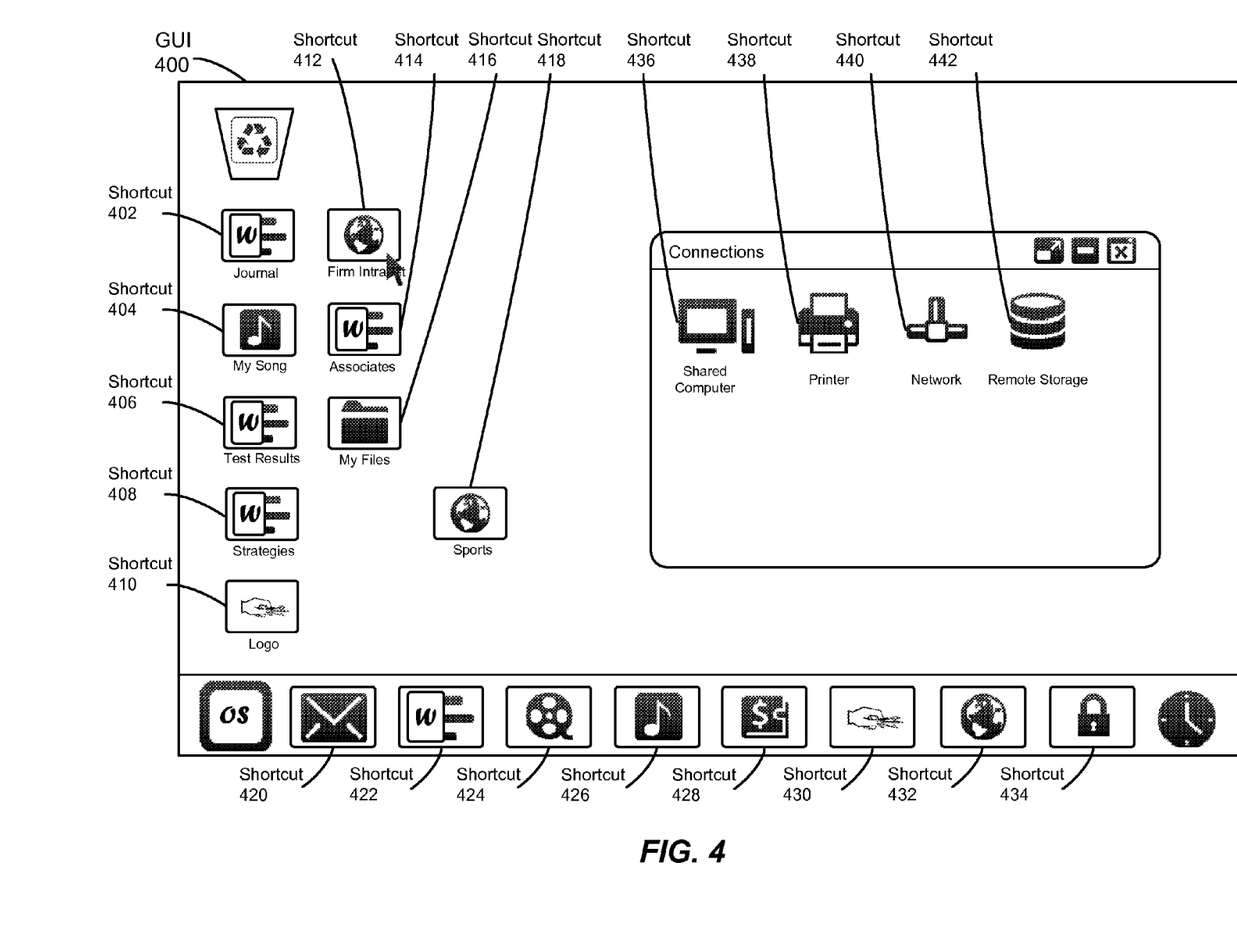
FIG. 4 is a block diagram of an exemplary graphical user interface according to embodiments of the instant disclosure.

FIG. 4 is a block diagram of an exemplary Graphical User Interface ("GUI") of a computing system (e.g., client 202 (a)). GUI 400 generally represents an operating system interface (e.g., desktop), and embodiments of the present disclosure may be implemented within any operating system, including WINDOWS, MAC OS, and/or LINUX. Embodiments of the instant disclosure may also be implemented on mobile computing platforms, such as ANDROID, APPLE IOS, PALM WEB OS, WINDOWS PHONE, and/or any other mobile computing platform.

As shown, GUI 400 may display an e-mail shortcut 420, a word processor shortcut 422, a movie editor program shortcut 424, a music player shortcut 426, a financial management software shortcut 428, a graphic editor shortcut 430, an Internet browser shortcut 432, and a security software shortcut 434. Icons 420-434 may be displayed in a taskbar region of GUI 400. GUI 400 may also display numerous desktop shortcuts, including a word processor document shortcut 402, a song shortcut 404, a word processor document shortcut 406, a word processor document shortcut 408, a drawing shortcut 410, an intranet shortcut 412, a word processor document shortcut 414, a directory shortcut 416, and a website shortcut 418.

GUI 400 also shows a connections window that includes a shared computer shortcut 436, a printer shortcut 438, a network shortcut 440, and a remote storage shortcut 442.

In one example, FIG. 4 shows an interface presented to a user on client 202(*a*) after the user has logged onto client 202(*a*) with user profile 220(*a*). In this example, determination module 108 may determine that each of shortcuts 222(*a*) target resources available on client 202(*a*). As a result, GUI 400 may display each of shortcuts 222(*a*). The user may log off client 202(*a*) and log onto client 202(*b*) at a later point in time.

When the user logs onto client 202(*b*), determination module 108 may determine that some of the resources targeted by shortcuts 222(*a*) may not be available on client 202(*b*). The difference between the resources available on clients 202(*a*) and (*b*) may be a result of slow update deployment to client 202(*b*), deactivated virtualization layers on client 202(*b*), and/or a variety of other factors.

Figure 5:
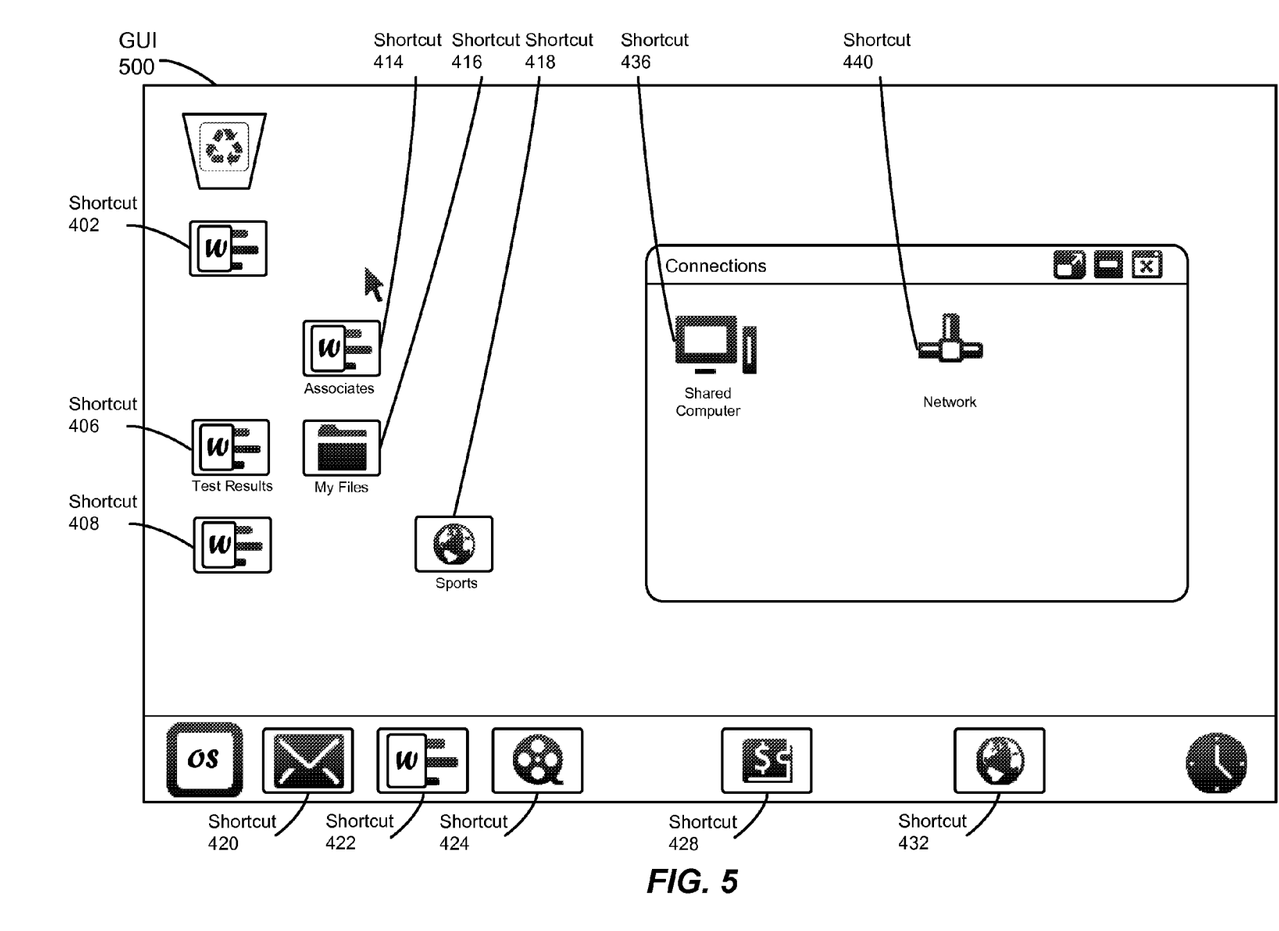
FIG. 5 is a block diagram of another exemplary graphical user interface according to embodiments of the instant disclosure.

Resources that are not available on client 202(*b*) may include a music player application, a drawing application, a security software application, an intranet, a printer, and a remote storage system. FIG. 5 shows a GUI 500 that may be presented to the user after logging onto client 202(*b*). As shown in GUI 500, music player shortcut 426 and song shortcut 404 may be filtered from the user's view, graphic editor shortcut 430 and drawing shortcut 410 may be filtered from the user's view, security software shortcut 434 may be filtered from the user's view, intranet shortcut 412 may be filtered from the user's view, printer shortcut 438 may be filtered from the user's view, and remote storage shortcut 442 may be filtered from the user's view.

In another example, a first user may log onto client 202(*c*) with user profile 220(*b*), but may not be able to access an application installed to a virtualization layer on client 202(*c*) because the virtualization layer is inactive. Thus, even though shortcuts 222(*b*) may include a shortcut to the application, the shortcut may be filtered from being displayed on client 202(*c*). The first user may log off client 202(*c*) and a second user may log onto client 202(*c*) using user profile 220(*c*). User profile 220(*c*) may also include a shortcut to the virtualized application, and the virtualization layer containing the application may be active for the second user. Thus, the shortcut to the virtualized application may be displayed when the second user logs onto client 202(*c*).

While FIG. 2 shows examples of roaming profiles in a network embodiment, as previously noted, the instant disclosure also applies to non-roaming profiles local to a single computer. In such embodiments, different users may access the same computer with different user profiles, and one user may make a configuration change that affects the availability of a resource for another user. Furthermore, embodiments of the instant disclosure are also applicable to single-user environments. Resource availability may change as a result of updates, license expirations, software issues, hardware issues, and/or any other factors that may result in a resource being unavailable to a user of a computing system. In all such situations, embodiments of the instant disclosure may be implemented to filter shortcuts to unavailable resources.

Embodiments of the instant disclosure may provide users with an accurate depiction of available resources for a computing system, which may reduce or eliminate user frustration with respect to broken shortcut issues. Thus, by implementing the systems described herein, enterprises may reduce user frustration, conserve valuable IT resources, and provide various other advantages and features to computing system users.

Figure 6:
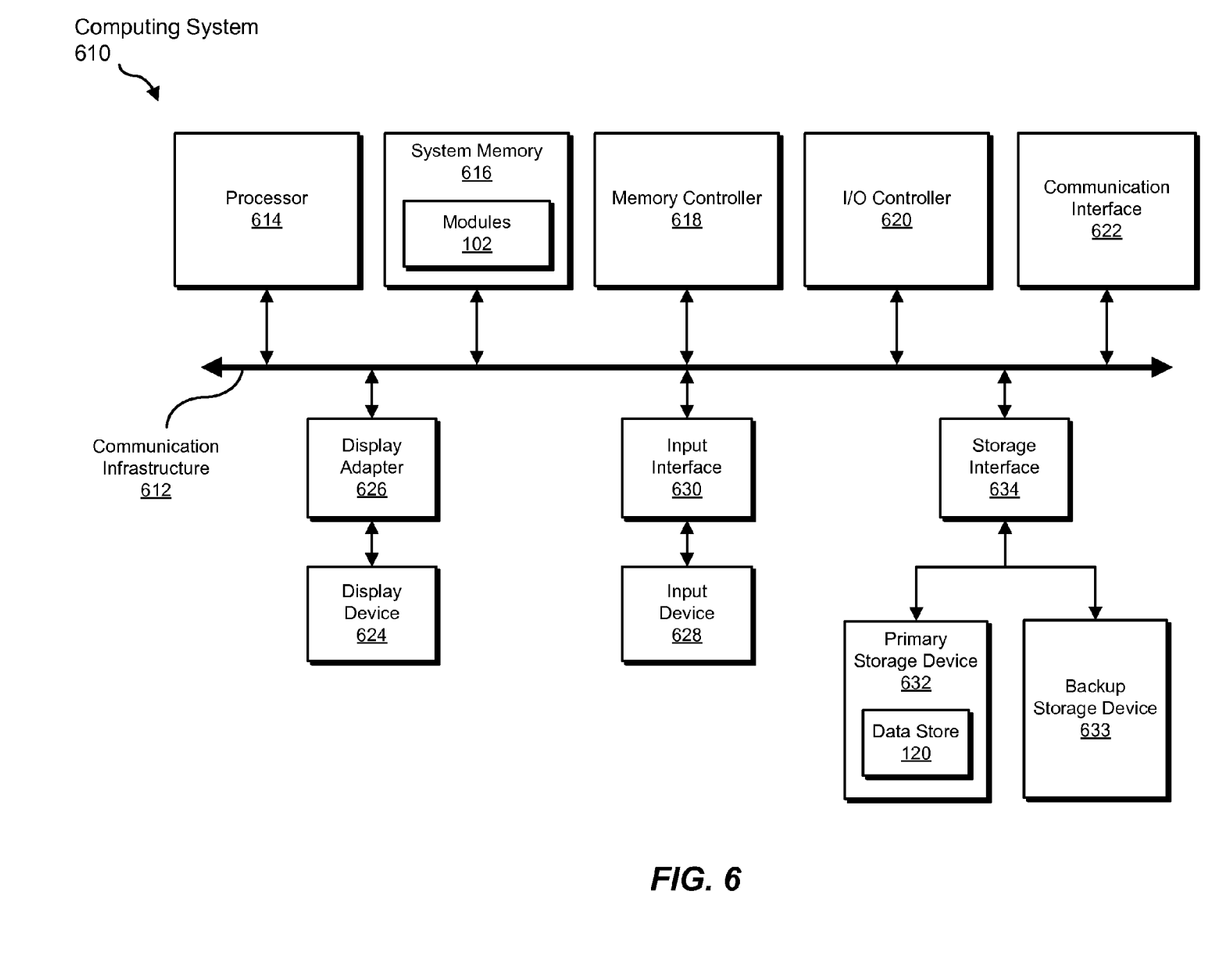
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, searching, determining, filtering, performing, allowing, removing, intercepting, and excluding steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, searching, determining, filtering, performing, allowing, removing, intercepting, and excluding.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, searching, determining, filtering, performing, allowing, removing, intercepting, and excluding steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, searching, determining, filtering, performing, allowing, removing, intercepting, and excluding steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, searching, determining, filtering, performing, allowing, removing, intercepting, and excluding steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data store 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, searching, determining, filtering, performing, allowing, removing, intercepting, and excluding steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
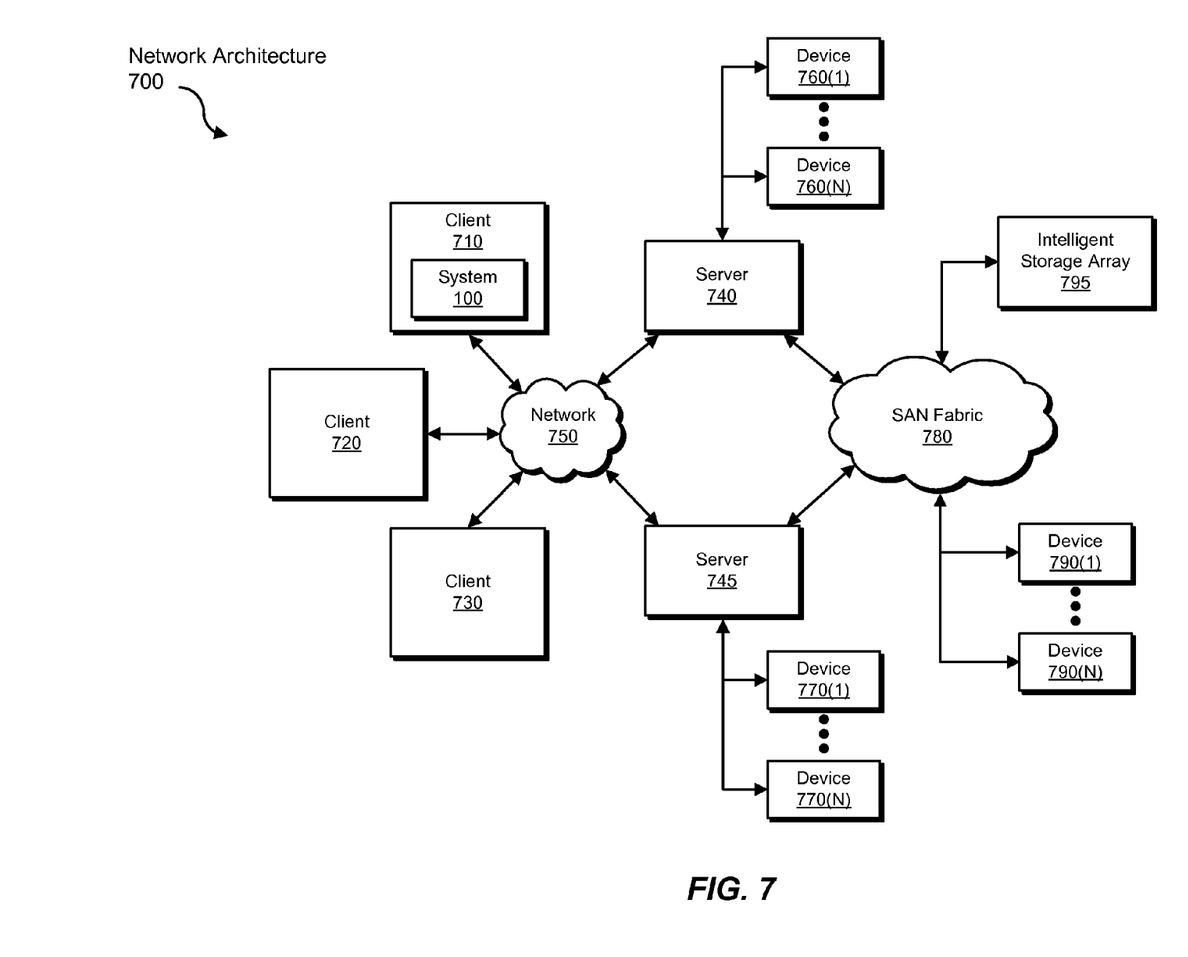
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, searching, determining, filtering, performing, allowing, removing, intercepting, and excluding steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for filtering shortcuts from user profiles.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium (i.e., a non-transitory computer-readable medium) or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform memory and/or a display of a client system by filtering one or more shortcuts that are presented to a user of the client system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for filtering shortcuts from user profiles, at least a portion of the method being performed by a computing device comprising at least one processor, the method comprising:
    identifying a first user logged onto a first computing system;
    identifying a profile of the first user that stores data associated with the first user, wherein the profile comprises one or more shortcuts that target one or more computing resources;
    searching the first user's profile for the one or more shortcuts;
    for each computing resource targeted by the one or more shortcuts in the first user's profile, searching the first computing system for the computing resource;
    determining, based on a result of the search of the first computing system, that at least one computing resource targeted by a shortcut in the first user's profile is not available on the first computing system;
    configuring a graphical user interface associated with the first computing system to present a user interface that is consistent with available resources of the first computing system by filtering the shortcut that targets the unavailable computing resource, wherein the filtering comprises preventing the shortcut from being displayed to the first user in the graphical user interface when other items associated with the first user's profile are displayed in the graphical user interface.

2. The method of claim 1, wherein:
    the unavailable computing resource comprises a software application;
    the shortcut to the unavailable computing resource targets the software application;
    determining that at least one computing resource is not available on the first computing system comprises determining that the software application is not accessible to the first user of the first computing system.

3. The method of claim 2, wherein:
    the software application is installed to a virtualization layer on the first computing system;
    determining that the software application is not accessible to the first user of the first computing system comprises determining that the virtualization layer is not activated.

4. The method of claim 2, wherein determining that the software application is not accessible to the first user of the first computing system comprises determining that the software application is not installed on the first computing system.

5. The method of claim 1, further comprising:
    identifying the first user logged onto a second computing system;
    identifying the first user's profile at the second computing system, wherein the first user's profile comprises a roaming profile stored remotely on a server and transferred to the second computing system when the first user logs onto the second computing system;
    performing a second search of the first user's profile for the one or more shortcuts that target the one or more computing resources;
    determining that the computing resource that is not available on the first computing system is available on the second computing system;
    allowing the shortcut that targets the computing resource to be displayed to the first user.

6. The method of claim 1, further comprising:
    identifying a second user logged onto the first computing system;
    identifying a profile of the second user that stores data associated with the second user;
    searching the second user's profile for one or more shortcuts that target one or more computing resources;
    during the search of the second user's profile, identifying a shortcut to the computing resource that is not available to the first user on the first computing system;
    determining that the computing resource that is not available to the first user on the first computing system is available to the second user on the first computing system;
    allowing the shortcut to the computing resource that is available to the second user to be displayed to the second user.

7. The method of claim 1, wherein the shortcut that targets the unavailable computing resource is programmed such that, if the shortcut were to be displayed at the first computing system and selected by the first user, the first computing system would return an error to the first user instead of accessing the unavailable computing resource.

8. The method of claim 1, wherein:
    the unavailable computing resource is associated with a hardware device;
    determining that at least one computing resource is not available on the first computing system comprises determining that the hardware device is not available to the first computing system.

9. The method of claim 8, wherein the hardware device comprises at least one of:
    a remote computing system;
    a printer.

10. The method of claim 1 wherein determining that at least one computing resource is not available on the first computing system comprises determining that the first computing system does not have a security credential required to access the unavailable computing resource.

11. The method of claim 1, wherein preventing the shortcut from being displayed comprises temporarily removing the shortcut from the first user's profile while the first user is logged onto the first computing system.

12. The method of claim 1, wherein preventing the shortcut from being displayed comprises hiding the shortcut by:
intercepting a request to provide shortcuts from the first user's profile;
excluding the shortcut from a response to the request.

13. A system for filtering shortcuts from user profiles, the system comprising:
an identification module programmed to:
identify a first user logged onto a first computing system;
identify a profile of the first user that stores data associated with the first user, wherein the profile comprises one or more shortcuts that target one or more computing resources;
a search module programmed to:
search the first user's profile for the one or more shortcuts;
for each computing resource targeted by the one or more shortcuts in the first user's profile, search the first computing system for the computing resource;
a determination module programmed to determine, based on a result of the search of the first computing system, that at least one computing resource targeted by a shortcut in the first user's profile is not available on the first computing system;
a filter module programmed to configure a graphical user interface associated with the first computing system to present a user interface that is consistent with available resources of the first computing system by filtering the shortcut that targets the unavailable computing resource, wherein the filtering comprises preventing the shortcut from being displayed to the first user in the graphical user interface when other items associated with the first user's profile are displayed in the graphical user interface;
one or more processors configured to execute the identification module, the search module, the determination module, and the filter module.

14. The system of claim 13, wherein:
the unavailable computing resource comprises a software application;
the shortcut to the unavailable computing resource targets the software application;
the determination module is programmed to determine that at least one computing resource is not available on the computing system by determining that the software application is not accessible to the first user of the first computing system.

15. The system of claim 14, wherein:
the software application is installed to a virtualization layer on the first computing system;
the determination module is programmed to determine that the software application is not accessible to the first user of the first computing system by determining that the virtualization layer is not enabled.

16. The system of claim 14, wherein the determination module is programmed to determine that the software application is not accessible to the first user of the first computing system by determining that the software application is not installed on the first computing system.

17. The system of claim 13, wherein the shortcut that targets the unavailable computing resource is programmed such that, if the shortcut were to be displayed at the first computing system and selected by the first user, the first computing system would return an error to the first user instead of accessing the unavailable computing resource.

18. The system of claim 13, wherein:
the unavailable computing resource is associated with a hardware device;
the determination module is programmed to determine that at least one computing resource is not available on the first computing system by determining that the hardware device is not available to the first computing system.

19. The system of claim 13, wherein the filter module is programmed to prevent the shortcut from being displayed by hiding the shortcut by:
intercepting a request to provide shortcuts from the first user's profile;
excluding the shortcut from a response to the request.

20. A non-transitory computer-readable-storage medium comprising computer-readable instructions that, when executed by at least one processor of a computing device, cause the computing device to:
identify a first user logged onto a first computing system;
identify a profile of the first user that stores data associated with the first user, wherein the profile comprises one or more shortcuts that target one or more computing resources;
search the first user's profile for the one or more shortcuts;
for each computing resource targeted by the one or more shortcuts in the first user's profile, search the first computing system for the computing resource;
determine, based on a result of the search of the first computing system, that at least one computing resource targeted by a shortcut in the first user's profile is not available on the first computing system;
configure a graphical user interface associated with the first computing system to present a user interface that is consistent with available resources of the first computing system by filtering the shortcut that targets the unavailable computing resource, wherein the filtering comprises preventing the shortcut from being displayed to the first user in the graphical user interface when other items associated with the first user's profile are displayed in the graphical user interface.

* * * * *